(12) United States Patent
Rhyu (10) Patent No.: US 11,257,443 B2
(45) Date of Patent: Feb. 22, 2022

(54) METHOD FOR PROCESSING IMAGE, AND DISPLAY DEVICE

(71) Applicant: Samsung Electronics Co., Ltd., Suwon-si (KR)

(72) Inventor: Sung-Ryeul Rhyu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/609,988

(22) PCT Filed: Jun. 26, 2018

(86) PCT No.: PCT/KR2018/007232
§ 371 (c)(1),
(2) Date: Oct. 31, 2019

(87) PCT Pub. No.: WO2019/004701
PCT Pub. Date: Jan. 3, 2019

(65) Prior Publication Data
US 2020/0058109 A1 Feb. 20, 2020

(30) Foreign Application Priority Data
Jun. 27, 2017 (KR) .......................... 10-2017-0081492

(51) Int. Cl.
*G09G 3/34* (2006.01)
*G06T 5/00* (2006.01)

(52) U.S. Cl.
CPC ........... *G09G 3/3426* (2013.01); *G06T 5/008* (2013.01)

(58) Field of Classification Search
CPC .... G09G 3/342; G09G 3/3426; G09G 3/3607; G09G 5/10; G09G 2310/024;
(Continued)

(56) References Cited

U.S. PATENT DOCUMENTS

2007/0152926 A1* 7/2007 Kwon ................ G09G 3/3426
345/82
2007/0252846 A1 11/2007 Ozawa et al.
(Continued)

FOREIGN PATENT DOCUMENTS

JP 2008-310147 A 12/2008
KR 10-2009-0060421 A 6/2009
(Continued)

OTHER PUBLICATIONS

Korean Office Action with English translation dated Mar. 10, 2021; Korean Appln. No. 10-2017-0081492.

*Primary Examiner* — William Boddie
*Assistant Examiner* — Jeffrey Parker
(74) *Attorney, Agent, or Firm* — Jefferson IP Law, LLP (57) ABSTRACT

A display device and an image processing method thereof are provided. An image processing method of a display device, according to the present disclosure, comprises the steps of: dividing a display unit of the display device into a plurality of regions; measuring brightness expression performance of the display device, including a value of a relation between the average brightness of the display unit and the brightness of one region among the plurality of regions; calculating an average brightness of an image inputted to the display device; mapping, to the measured brightness expression performance, the calculated average brightness of the inputted image; adjusting the brightness of a region, excluding an emphasized region, of the inputted image so as to generate an adjusted image; and outputting the adjusted image.

12 Claims, 10 Drawing Sheets

(58) Field of Classification Search
CPC ... G09G 2320/0233; G09G 2320/0271; G09G 2320/0276; G09G 2320/062; G09G 2320/0626; G09G 2320/0633; G09G 2320/066; G09G 2320/0686
See application file for complete search history.

(56) References Cited

U.S. PATENT DOCUMENTS

| | | | | |
|---|---|---|---|---|
| 2009/0278766 | A1* | 11/2009 | Sako | G02B 27/0172 345/8 |
| 2011/0025728 | A1 | 2/2011 | Baba et al. | |
| 2011/0316829 | A1* | 12/2011 | Oka | G09G 3/3426 345/207 |
| 2012/0019568 | A1* | 1/2012 | Nobori | H04N 13/122 345/690 |
| 2013/0314641 | A1* | 11/2013 | Okuda | G02F 1/1336 349/61 |
| 2015/0294627 | A1 | 10/2015 | Yoo et al. | |
| 2015/0348471 | A1* | 12/2015 | Meng | G09G 3/3426 345/691 |
| 2018/0082660 | A1* | 3/2018 | Xu | G09G 3/3208 |

FOREIGN PATENT DOCUMENTS

| | | |
|---|---|---|
| KR | 10-1148394 B1 | 5/2012 |
| KR | 10-1192779 B1 | 10/2012 |
| KR | 10-2015-0118721 A | 10/2015 |
| KR | 10-1579385 B1 | 12/2015 |
| KR | 10-2016-0072274 A | 6/2016 |

\* cited by examiner

Content, shown on Mastering display → Rendered content on Less brighter Target display

METHOD FOR PROCESSING IMAGE, AND DISPLAY DEVICE

CROSS-REFERENCE TO RELATED APPLICATION(S)

This application is a U.S. National Stage application under 35 U.S.C. § 371 of an International application number PCT/KR2018/007232, filed on Jun. 26, 2018, which is based on and claimed priority of a Korean patent application number 10-2017-0081492, filed on Jun. 27, 2017, in the Korean Intellectual Property Office, the disclosure of which is incorporated by reference herein in its entirety.

TECHNICAL FIELD

The disclosure relates to a method and display device for processing an image and, more specifically, to an image processing method in which an input image is adjusted considering a brightness expression performance of a display device, and is then applied to the display device.

BACKGROUND ART

A dynamic range of a display device indicates a ratio of the brightest gradation in comparison with the darkest gradation that can be expressed by a display. A recent display device has a broader dynamic range and can express high brightness, thereby enabling an expression of a high dynamic range (HDR) image.

In order to display, on a display device, images produced to have a higher level of brightness than the brightness of the display device, a process for processing image quality is required. If the image is expressed on a HDR display device without any image quality processing process, an unnatural image is generated. Therefore, a tone mapping technology, i.e. a technology for modifying the produced image to be suitable for the HDR display, is required.

DETAILED DESCRIPTION OF THE INVENTION

Technical Problem

The disclosure provides a display device which measures a brightness expression performance of the display device and maps an average brightness value of an input image to the measured performance so as to adjust a brightness of the image to be suitable for a brightness range that can be expressed by the display device, and an image processing method thereby.

Technical Solution

An image processing method of a display device according to the disclosure includes: dividing a display unit of a display device into a plurality of regions; measuring a brightness expression performance of the display device, including a value relating to a relation between an average brightness of the display unit and a brightness of one region among the plurality of regions, and then inputting or transmitting a measurement result to the display device; obtaining an average brightness of an image input to the display device; receiving information on an emphasis region of the input image; mapping the obtained average brightness of the input image to the measured brightness expression performance of the emphasis region; adjusting a brightness of the other regions except the emphasis region in the input image so as to generate an adjusted image; and outputting the adjusted image.

A display device according to the disclosure includes an image input unit configured to receive an image as input, an image processing unit configured to adjust the input image to generate an adjusted image, and a display unit configured to output the adjusted image, wherein the image processing unit is configured to: divide the display unit into a plurality of regions; measure a brightness expression performance of the display device, including a value relating to a relation between an average brightness of the display unit and a brightness of one region among the plurality of regions; obtain an average brightness of the input image; map the obtained average brightness of the input image to the measured brightness expression performance; and adjust a brightness of the other regions except an emphasis region in the input image to generate an adjusted image.

Advantageous Effects

According to the disclosure, a brightness range of an image to be displayed on a display device is applied to a brightness range of the display device so as to express the image on the display device. Color agglomeration and image distortion are minimized to express details of the image.

MODE FOR CARRYING OUT THE INVENTION

The terms used in the specification will be briefly described and the disclosure will be described in detail.

For the terms used in embodiments of the disclosure, general terms, which are used with as broad a concept as possible at present in consideration of functions in the disclosure, are selected, but the terms may vary depending on an intention of those skilled in the art, a precedent, appearance of a new technology, and the like.

A "module" or "unit" in embodiments of the disclosure performs at least one function or operation, and may be implemented as hardware or software, or may be implemented as a combination of hardware and software. In addition, a plurality of "modules" or a plurality of "units", except the "module" or "unit" required to be implemented as a specific hardware may be integrated into at least one module to be implemented as at least one processor (not shown).

As used in various embodiments of the disclosure, the expressions "include", "may include", and other conjugates refer to the existence of a corresponding disclosed function, operation, or constituent element, and do not limit one or more additional functions, operations, or constituent elements. Further, as used in various embodiments of the disclosure, the terms "include", "have", and their conjugates are intended merely to denote a feature, numeral, step, operation, element, component, or a combination thereof, disclosed in the specification, and should not be construed to initially exclude the existence of or a possibility of addition of one or more other features, numerals, steps, operations, elements, components, or combinations thereof.

Further, as used in various embodiments of the disclosure, the expression "or" includes any or all combinations of words enumerated together. For example, the expression "A or B" may include A, may include B, or may include both A and B.

While expressions including ordinal numbers, such as "first" and "second", as used in various embodiments of the disclosure may modify various constituent elements of the various embodiments, such constituent elements are not limited by the above expressions. For example, the above expressions do not limit the sequence and/or importance of the corresponding constituent elements. The above-described expressions may be used to distinguish an element from another element. For example, a first user device and a second user device indicate different user devices although the both are user devices. For example, without departing from the scope of various embodiments of the disclosure, a first component element may be named a second component element. Similarly, the second component element also may be named the first component element.

It should be noted that if in various embodiments of the disclosure, it is described that, one component element is "coupled" or "connected" to another component element, it may be construed that the first component element may be directly coupled or connected to the second component, and a third component element may exist between the first component element and the second component elements. Conversely, it should be noted that if it is described that one component element is "directly coupled" or "directly connected" to another component element, it may be construed that a third component element does not exist between the first component element and the second component element.

The terms used in various embodiments of the disclosure are used only to describe a specific embodiment, and are not intended to limit the various embodiments of the disclosure. As used herein, the singular forms are intended to include the plural forms as well, unless the context clearly indicates otherwise.

Unless defined otherwise in various embodiments of the disclosure, all terms used herein, including technical terms and scientific terms, have the same meaning as commonly understood by a person of ordinary skill in the art to which various embodiments of the disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the disclosure.

APL may indicate an average peak level or an average picture level, or may be replaced by a term "loading". What APL indicates may be an average brightness value of a plurality of pixels included in a display unit of a display device.

Hereinafter, a method for measuring a brightness expression characteristic of a display device according to one embodiment of the disclosure will be described with reference to FIGS. 1A, 1B, 2A to 2D, 3A, and 3B.

FIGS. 1A, 1B, and 2A to 2D are diagrams briefly illustrating a method for measuring a brightness expression characteristic of a display device according to one embodiment of the disclosure. FIGS. 3A and 3B schematically illustrate a light source of the display device according to one embodiment of the disclosure.

Figure 1A:
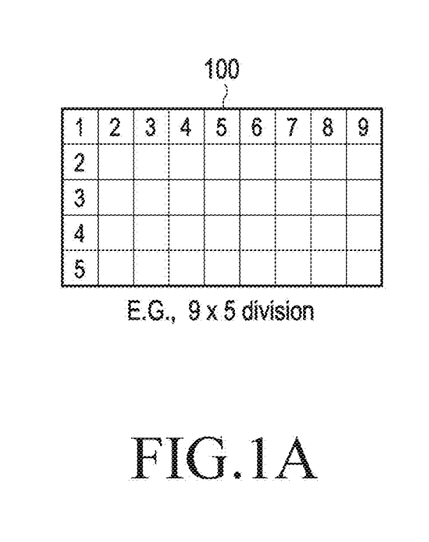
FIGS. 1A, 1B, 2A, 2B, 2C, and 2D are diagrams briefly illustrating a method for measuring a brightness expression characteristic of a display device according to one embodiment of the disclosure.
Figure 1B:
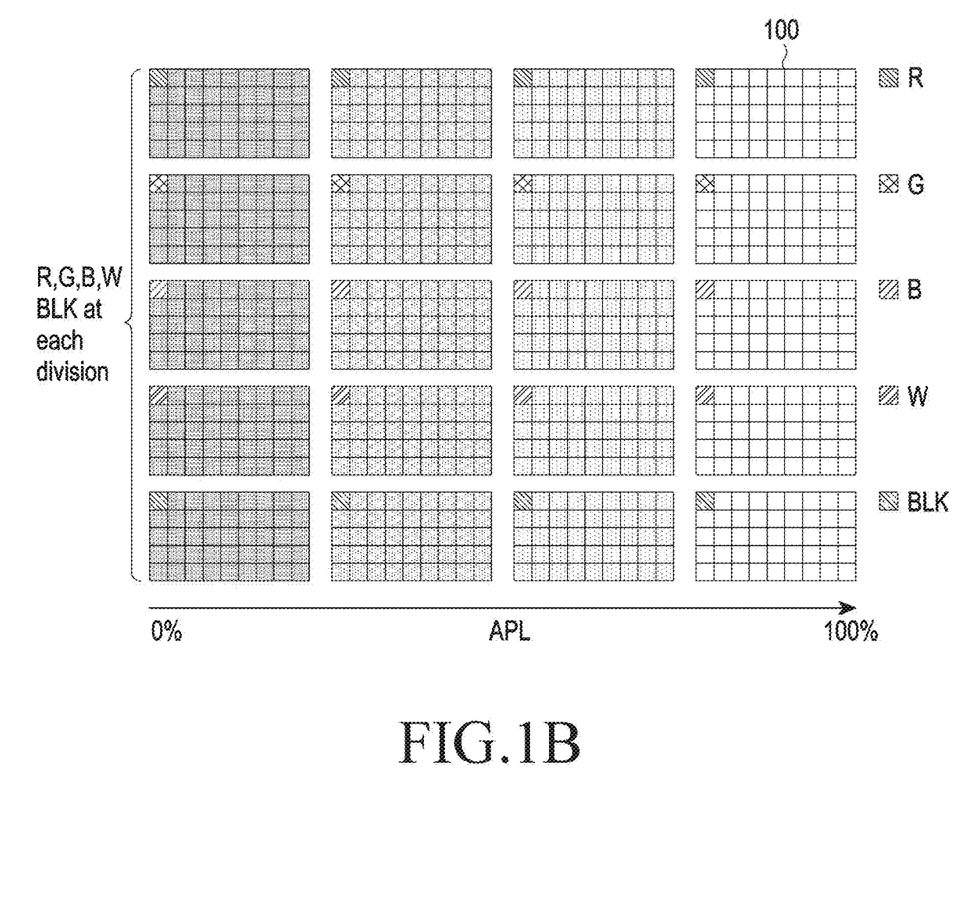

FIG. 1A illustrates a display unit of the display device according to one embodiment of the disclosure, and FIG. 1B schematically illustrates the brightness of the display unit of the display device according to one embodiment of the disclosure, according to a change of APL.

In order to measure a brightness expression characteristic of the display device, the display unit of the display device may be divided in a matrix form. According to FIG. 1A, the display unit 100 of the display device may be divided into 45 regions in 5 rows and 9 columns. However, this division is only one embodiment and a method for the division is not limited to the embodiment. FIG. 1B illustrates an average brightness of the display unit 100 of the display device in comparison with APL (0%-100%) according to colors of red (R), green (G), blue (B), white (W), and black (B). APL may be an average brightness value of a plurality of pixels included in the display unit 100 of the display device. An APL value of 0% may indicate the average brightness of the plurality of pixels included in the display unit 100 of the display device, which are completely blocked from light so as to express 100% black. An APL value of 100% may indicate the average brightness of the plurality of pixels included in the display unit 100 of the display device, which completely transmit light so as to express 100% white. Therefore, as shown in FIG. 1B, as an APL value increases from 0% to 100%, the average brightness of the display unit 100 of the display device may become brighter.

Figure 2A:
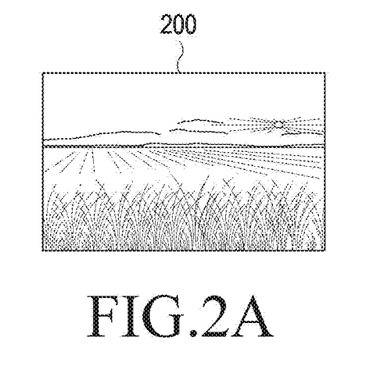
Figure 2B:
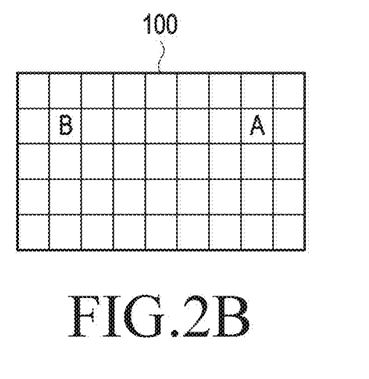
Figure 2C:
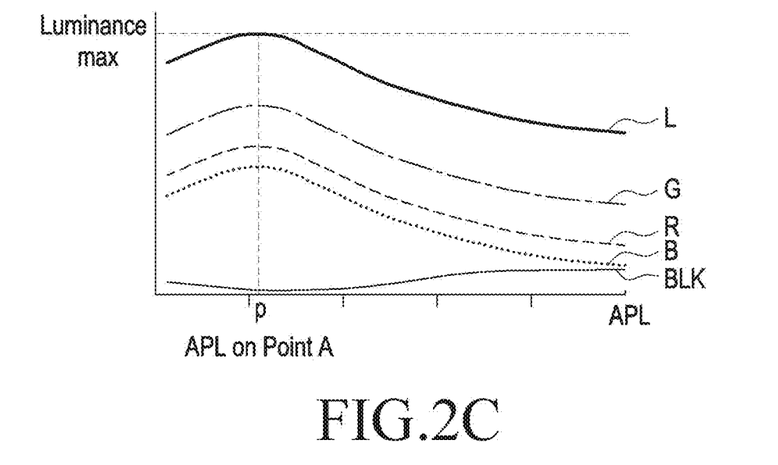
Figure 2D:
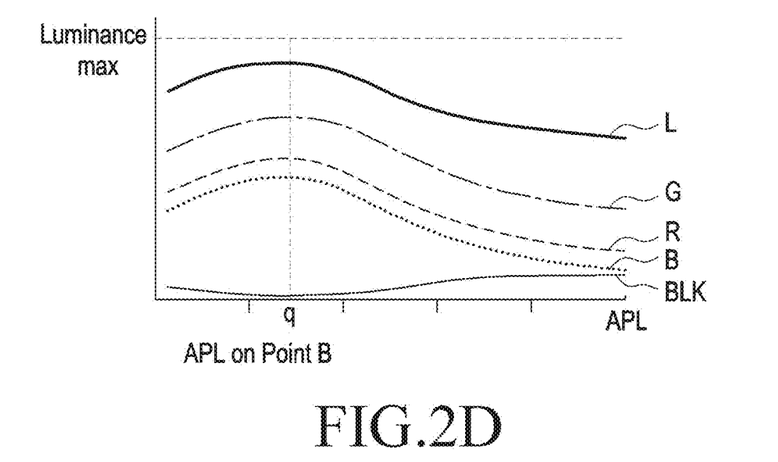
Figure 3A:
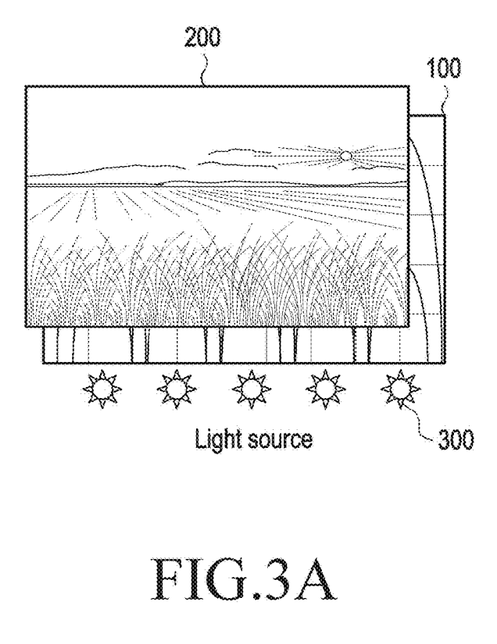
FIGS. 3A and 3B schematically illustrate a light source of a display device according to one embodiment of the disclosure.
Figure 3B:
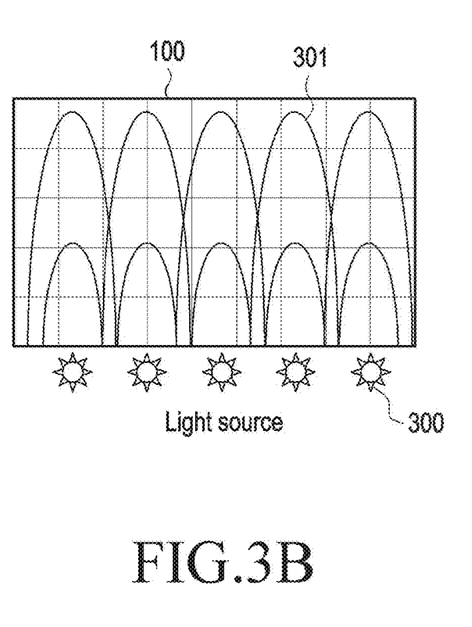

FIG. 2A exemplarily illustrates one scene displayed by the display unit of the display device according to one embodiment of the disclosure. FIG. 2B illustrates that the display unit of the display device according to one embodiment of the disclosure is divided into a plurality of regions. FIGS. 2C and 2D illustrate APL graphs for one region among the plurality of divided regions of the display unit of the display device according to one embodiment of the disclosure.

Referring to FIG. 2A, the display unit 100 of the display device may display one scene 200. Referring to FIG. 2B, one or more regions, whose display device characteristic is to be measured, may be selected from among the plurality of divided regions of the display unit 100 of the display device. FIG. 2B illustrates two selected regions A and B, and a first region A may indicate a region in which the sun having the highest brightness is located in the scene 200 displayed by the display unit 100 of the display device. A second region B may indicate a region in which a shadow having the lowest brightness is cast in the scene 200 displayed by the display unit 100 of the display device. Even though FIG. 2B representatively illustrates the two selected regions A and B, a method for the selection is not limited thereto. In addition, characteristics of all the divided regions of the display unit 100 of the display device may be measured. Referring to FIG. 2C, in the APL graph of the first region A, the x-axis may indicate an APL value and the y-axis may indicate a brightness of the first region A. For the sake of convenience, the brightness of the first region A may be measured at the center point of the first region A. The APL graph of FIG. 2C may represent a measurement result of a brightness expression characteristic of the first region A. The brightness may be measured for each of total brightness (L), green brightness (G), red brightness (R), blue brightness (B), and black brightness (BLK).

One embodiment of a method for obtaining APL will be concretely described. The display unit of the display device may include a plurality of pixels. Each of the pixels may include a plurality of subpixels expressing red (R), green (G), and blue (B), respectively. Classification of red (R), green (G), and blue (B) is only one embodiment and color composition of the subpixels is not limited thereto. In one pixel, a brightness value R of a subpixel expressing red (R) may be multiplied by a coefficient value α of the red (R) subpixel. In addition, in one pixel, a brightness value G of a subpixel expressing green (G) may be multiplied by a coefficient value β of the green (G) subpixel. In one pixel, a brightness value B of a subpixel expressing blue (B) may be multiplied by a coefficient value γ of the blue (B) subpixel. Here, the values α, β, and γ may be a kind of weight that considers, according to colors, how red (R), green (G), and blue (B) having different brightnesses affect total brightness. A brightness value Y ($Y=R*\alpha+G*\beta+B*\gamma$) of one pixel may be obtained by adding the obtained values together. A value Y of each of all the pixels included in the display unit is obtained, and an average value Y may thus be obtained by adding the values Y of all the pixels together and then dividing a total of the values Y by the total number of the pixels. The obtained average value Y may be an APL value. A method for obtaining APL is not limited thereto, and different methods may be used depending on a color expression method such as YUV and the like and depending on the coefficient values α, β, and γ. In order to obtain APL, any method for obtaining an average brightness of all pixels may be applied without limitation.

It is noted from FIG. 2C that the brightness of the first region A changes according to a change of the APL value. Specifically, it is noted that, as the APL value, i.e. the average brightness value of the display unit of the display device, increases, the brightness value of the first region A entirely decreases. The change in the brightness of the first region A according to the APL value may be due to the limited energy available to the display device. The display device is a device which changes electric power to light for displaying, so the display device needs energy. Since the energy available to the entire display unit is limited, a brightness of a specific region may be affected depending on a brightness of other regions. That is, the APL value of the display device decreases, so that the brightness of the specific region may increase.

In the graph of FIG. 2C, particularly, if the APL value is p, the brightness value of the first region A may be the maximum, and the maximum value may indicate a brightness expression performance of the display device.

Referring to FIG. 2D, in the APL graph of the second region B, the x-axis may indicate an APL value and the y-axis may indicate a brightness of the second region B. In the graph of FIG. 2D, particularly, if the APL value is q, the brightness value of the second region B may be the maximum. This maximum value may be less than the maximum brightness value of the first region A if the APL value of FIG. 2C is q. This is only one embodiment and the maximum brightness value of the second region B may be greater than the maximum brightness value of the first region A. The difference of the maximum brightness value for each region may depend on a position of a light source of a display device, a light source alignment matter, and the like.

FIG. 3A schematically illustrates a position of a light source of a display device according to one embodiment of the disclosure, and FIG. 3B illustrates a region of a display unit of the display device according to one embodiment of the disclosure, which light of the light source reaches, by using lines.

The display device may include one or more light sources 300. With reference to the display unit 100 of the display device on which an image 200 is displayed, the light source 300 may be located to overlap the display unit, but as shown in FIG. 3A, may be located in a side of the display unit 100. Referring to FIG. 3B, in the case where the light source 300 is located in the side of the display unit 100 of the display device, an amount of light of the light source 300, reaching the display unit, may vary depending on a position of the display unit 100. That is, since an amount of available light varies depending on the position of the display unit, as shown in the graphs of FIGS. 2C and 2D, the maximum value of the APL graph may vary depending on the position of the display unit.

Hereinafter, a method for applying a produced image to a display device according to one embodiment of the disclosure will be described with reference to FIGS. 2A to 2D, 4, 5A, and 5B.

Figure 4:
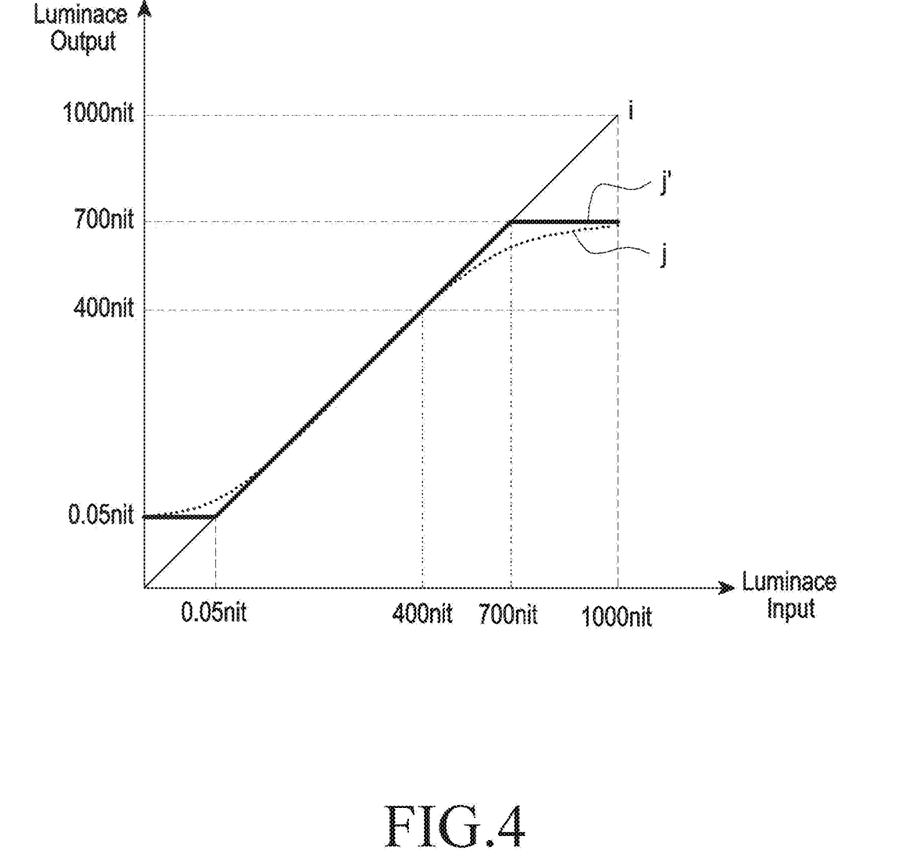
FIG. 4 illustrates a graph representing a brightness expression range of a display device according to one embodiment of the disclosure.
Figure 5A:
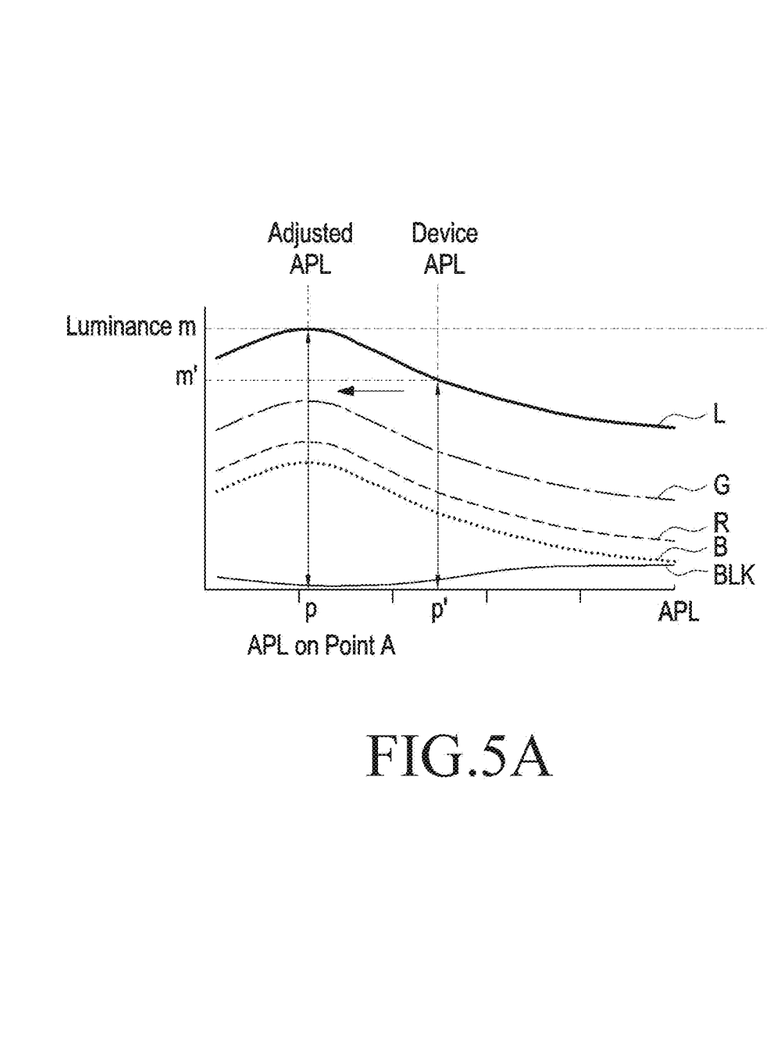
FIGS. 5A and 5B are diagrams briefly illustrating a method for applying an image to a display device according to one embodiment of the disclosure.
Figure 5B:
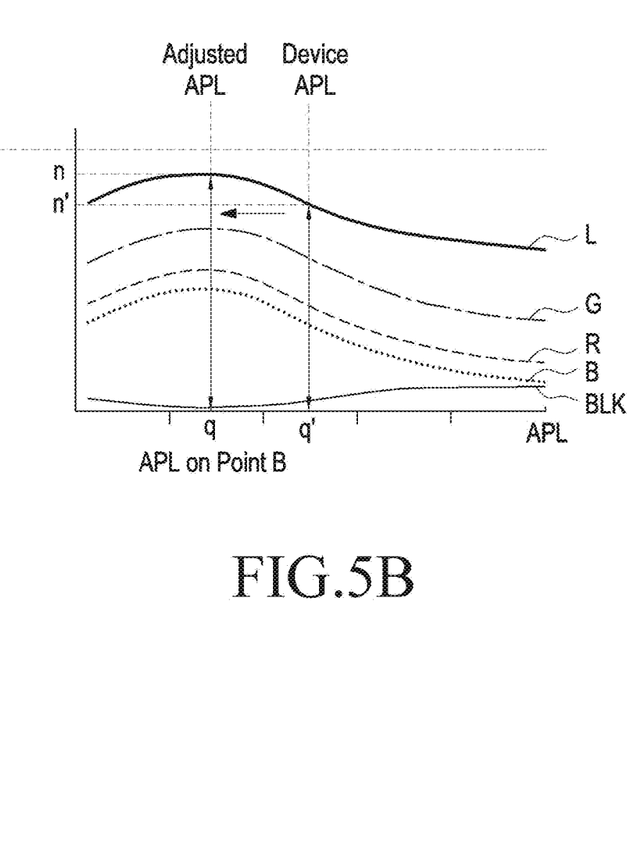

FIG. 4 illustrates a graph representing a brightness expression range of a display device according to one embodiment of the disclosure. FIGS. 5A and 5B are diagrams briefly illustrating a method for applying an image to the display device according to one embodiment of the disclosure.

First, description will be given hereinafter with reference to FIG. 4. In a graph of FIG. 4, the x-axis indicates an input brightness and the y-axis indicates an output brightness, the brightness range being within a range of 0-1000 nit.

A brightness range of an image to be displayed on the display device may be different from a brightness range of the display device. An image may be produced to have a brightness range broader than the brightness range of the display device. For example, an image may be produced based on a mastering display capable of expressing brightness within a range of 0.0001-4000 nit. As shown in line i of the graph of FIG. 4, the mastering display may output and express an input brightness having a range of 0.0001-1000 nit as it is. In order to display this image on a display device having a brightness expression performance having a different range, the image may be required to go through a process so as to be applied to the display device. For example, if an image having a brightness range of 0.0001-4000 nit is displayed on a display device capable of expressing brightness within a range of 0.05-700 nit, all regions having a brightness greater than or equal to 700 nit may be expressed at the same brightness. It is noted that as shown in line j' of the graph of FIG. 4, the input brightness greater than or equal to 700 nit is output at the same brightness. All regions having a brightness less than or equal to 0.05 nit may be expressed at the same brightness. It is noted that as shown in line j' of the graph of FIG. 4, the input brightness less than or equal to 0.05 nit is output at the same brightness.

Therefore, in order to display a region of an image scene, having a brightness range which cannot be expressed by a display device, a brightness range of the image is required to be applied to a brightness range of the display device. It is noted that as shown in line j of the graph of FIG. 4, around the brightness range which cannot be expressed by the display device, an input brightness is adjusted to enable the input brightness within a range of 0-1000 nit to be classified and expressed as an output brightness having different values within a range of 0.05-700 nit. This is only one embodiment, and the brightness range of the input image and the brightness range of the display device are not limited to the embodiment, and a graph line by which the image is applied to the display device is not limited to a shape of line j. Output brightness values of some of regions may overlap each other.

A method for applying an image to a display device will be described with reference to FIGS. 2A to 2D, 5A, and 5B. FIG. 5A represents an APL graph on the first region A of FIG. 2B, and FIG. 5B represents an APL graph on the second region B of FIG. 2B.

An average brightness value Y of one scene among a plurality of scenes included in an image to be displayed on a display may be obtained. The average brightness value Y of the scene may be a value obtained by adding brightness values of a plurality of pixels of the scene together and then dividing a total of the values by the number of the plurality of pixels. The average brightness value Y of the scene may be the same as the method for obtaining an APL value previously described in FIGS. 2A to 2D.

As shown in FIG. 2B, the scene may be divided into a plurality of regions. At this point, in order to measure a brightness expression characteristic for each region of a display device to be applied, division may be performed in the same method as the method for dividing into the plurality of regions. For example, the scene may be divided into 45 regions in 5 rows and 9 columns in the same manner as the display device. A region whose brightness is to be adjusted may be selected from among the plurality of regions of the scene. An APL graph of a region of a display unit of a display device, corresponding to the selected region, may be mapped by the previously obtained average brightness value Y. For example, if a region in 2 rows and 8 columns is selected from among the plurality of regions of the scene, a region of the display unit of the display device, corresponding to this region, is the first region A, and the APL graph on the first region A (graph of FIG. 5A) may thus be mapped by the average brightness value Y. As shown in FIG. 5A, a value p' may be mapped by the average brightness value Y. At this point, the average brightness value Y may be equal to the values p'. The average brightness value Y and the APL value of FIG. 5A have the same ratio, and the average brightness value Y may thus be mapped to the APL value of FIG. 5A as it is. If the average brightness value Y is mapped to the value p', a brightness value m', at which the region in 2 rows and 8 columns of the scene is displayed on the display device, may be obtained.

It is noted that if the scene is adjusted to have an increased brightness value m at which the region in 2 rows and 8 columns is displayed on the display device, the APL value is required to decrease to a value p. That is, as brightness values of the other regions except the region in 2 rows and 8 columns decrease, the scene may be applied to the display device. At this point, the scene may be adjusted to enable a contrast ratio of the scene adjusted for the display device to be a value between a contrast ratio of an original scene and a contrast ratio of the scene displayed on the display device without adjustment. In addition, without a decrease in brightness of all of the other regions except the region in 2 rows and 8 columns, a brightness of a region expressing a specific color may be maintained. The specific color may be a color in which a human eye sensitively responds to a change thereof. The specific color may be a color of the sky, a color of skin, and the like.

If a region in 2 rows and 2 columns is selected from among a plurality of regions of one scene of an image to be displayed on the display, a region of the display unit of the display device corresponding to this region is the second region B, and the APL graph on the second region B (graph of FIG. 5B) may thus be mapped by the average brightness value Y. In the same method, a brightness value at which the region in 2 rows and 2 columns is displayed on the display device may be adjusted.

Hereinafter, information on a part whose brightness is to be adjusted and a part whose brightness is to be maintained, in one scene of an image provided to be displayed on the display device, will be described with reference to FIGS. 2A to 2D, 6A, 6B, 7, and 8.

Figure 6A:
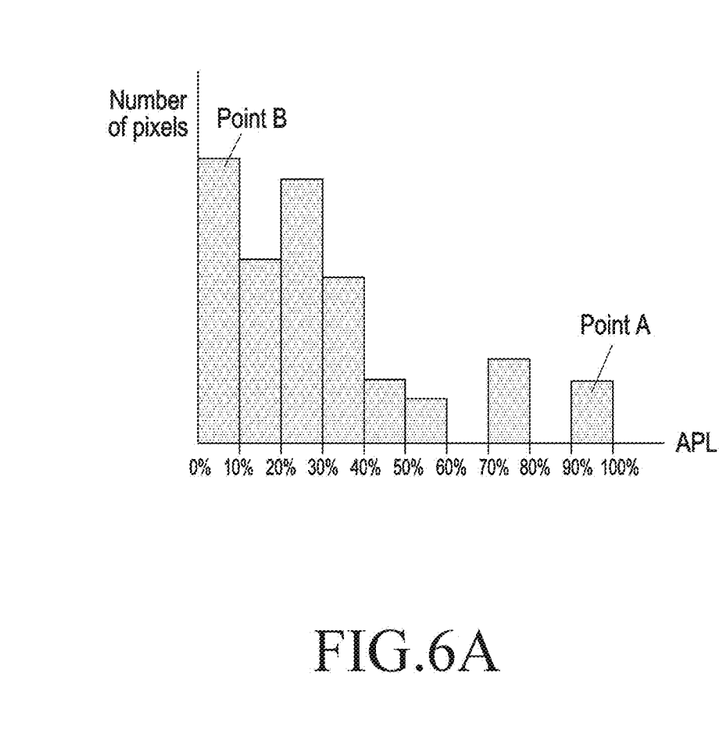
FIGS. 6A and 6B illustrate histograms representing the number of pixels corresponding to each APL section, according to one embodiment of the disclosure.
Figure 6B:
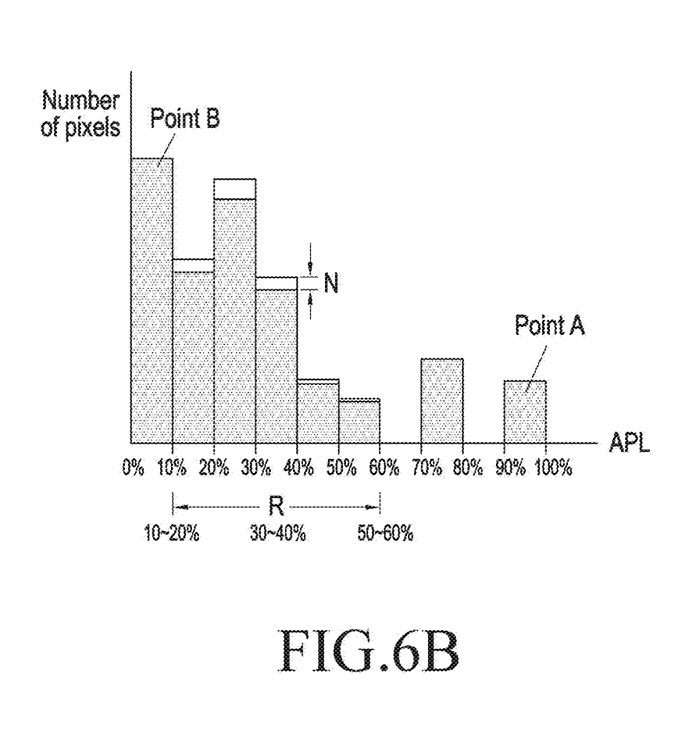
Figure 7:
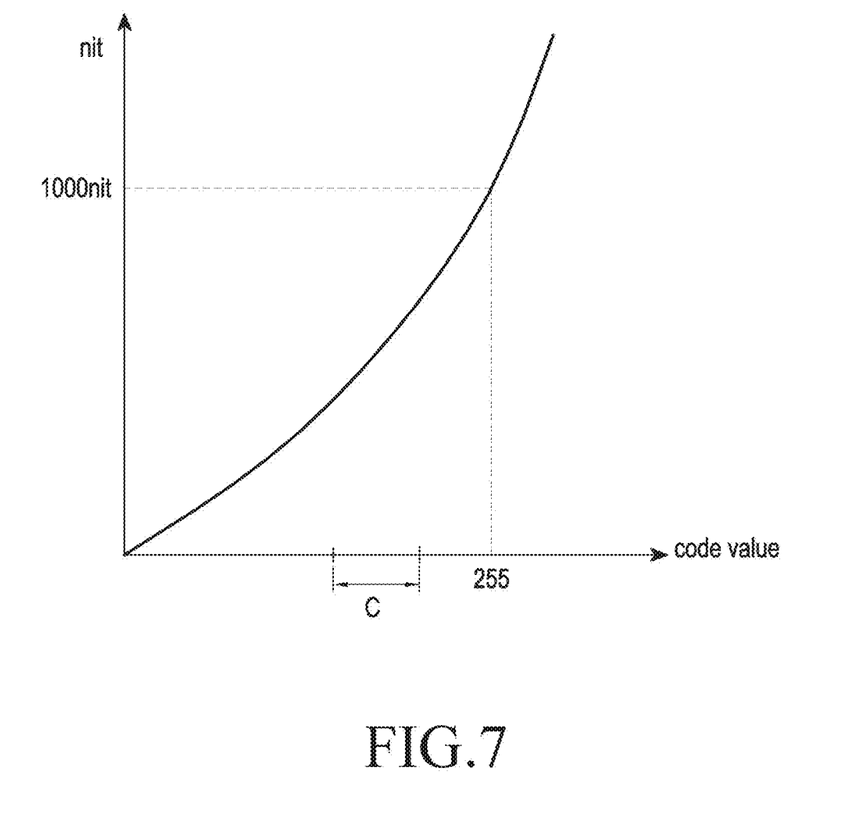
FIG. 7 represents an electro optical transfer function (EOTF) for a code value.
Figure 8:
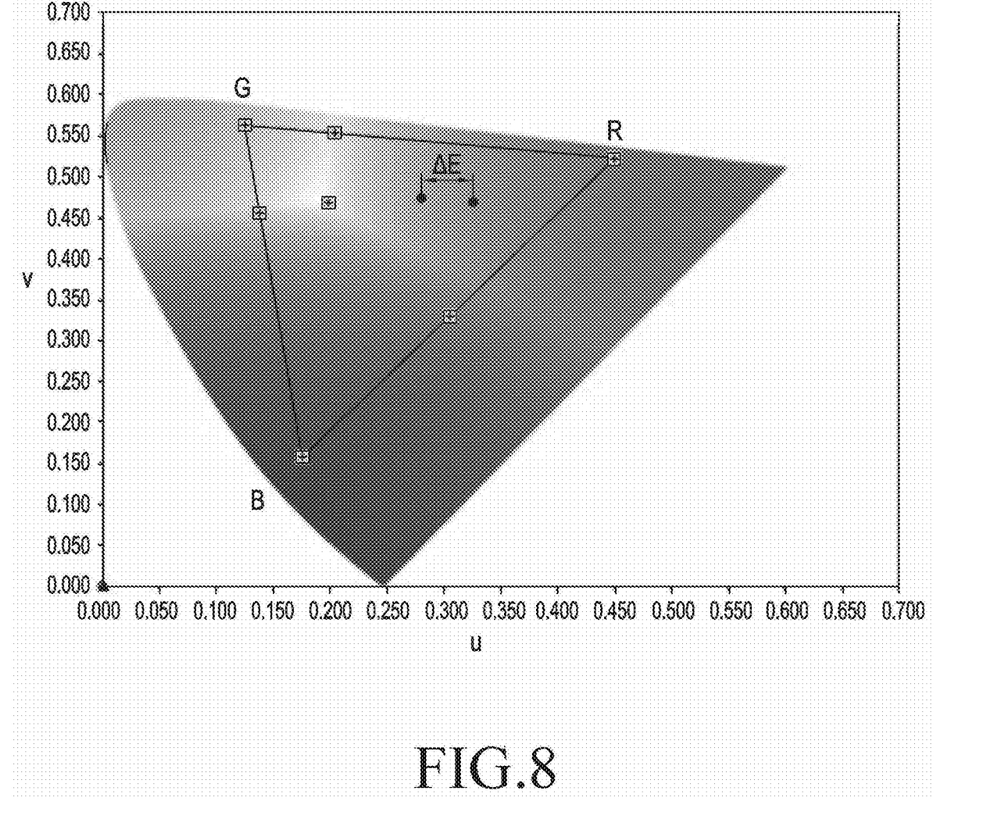
FIG. 8 illustrates colors expressed in a color space.

FIGS. 6A and 6B are histograms representing the number of pixels corresponding to an APL section according to one embodiment of the disclosure. FIG. 7 illustrates an electro optical transfer function (EOTF) for a code value. FIG. 8 illustrates colors expressed in a color space.

As previously described with reference to FIGS. 2A to 2D, 5A, and 5B, a brightness of an image may be adjusted to display the image on the display device. According to one embodiment previously described with reference to FIGS. 2A to 2D, 5A, and 5B, a brightness of regions except the first region A and the second region B is adjusted to increase the brightness of the first region A and the second region B, and the image may thus be applied to the display device. At this point, information on a region whose brightness is to be increased and a region whose brightness is to be decreased, may be provided for the display device. Also, information on a region whose brightness is to be maintained may be provided for the display device. The information may be transmitted to the display device as metadata and may be directly input to the display device by a user.

The information provided for the display device may include coordinate information on a region whose brightness is to be emphasized or maintained. For example, coordinates of the region whose brightness is to be emphasized or maintained may be provided by using the xy coordinate system. An emphasis region whose brightness is to be emphasized may be a highlighted region, i.e. a black region, and a maintenance region whose brightness is to be maintained may be a region expressing a specific color and the like. Here, the highlighted region may be a region including an object and the like that an image producer wants to emphasize in an image, located therein. For example, in the case where the producer wants to emphasize a car reflecting sunlight, rather than the sun itself, a region including the car located therein may be selected as the highlighted region in one scene of the image. The black region may be a region that the producer wants to maintain as black. As previously described, the region expressing a specific color may express a color such as a color of the sky, a color of skin, and the like in which a human eye sensitively responds to a change thereof so as to be maintained.

Referring to FIGS. 6A and 6B, the information on the region whose brightness is to be maintained may be represented in a range of a histogram. FIG. 6A is a histogram representing the number of pixels for each APL section, and FIG. 6B is a histogram schematically representing a method for adjusting the number of pixels for each APL section in the histogram of FIG. 6A.

In FIGS. 6A and 6B, the x-axis indicates an APL value for each section. For example, the APL value may be represented for each 10% section, such as 0-10%, 10-20%, 20-30%, . . . , 80-90%, and 90-100%. In FIGS. 6A and 6B, the y-axis indicates the number of pixels and more particularly the number of pixels having the brightness corresponding to each section of the APL value. As shown in FIGS. 6A and 6B, the pixels, corresponding to the first region A of FIGS. 2A to 2D, correspond to the rightmost bar graph of the histogram, namely a section of 90-100% of the APL value. The pixels, corresponding to the second region B of FIGS. 2A to 2D, correspond to the leftmost bar graph of the histogram, namely a section of 0-10% of the APL value. At this point, in order to increase the brightness of the first region A and the second region B, as shown in FIG. 6B, the number of pixels of the remaining bar graphs except the bar graphs corresponding to the first region A and the second region B may be decreased. As the number of pixels decreases, the brightness of the first region A or the second region B may increase as much as the entire brightness of the scene decreases. That is, information on an APL section of the histogram, whose number of pixels is to be decreased may be provided for the display device. For example, as shown in FIG. 6B, the information on the APL section R (section of 10%-60%) whose number of pixels is to be decreased, except the first region A and the second region B, may be provided for the display device. The display device for which the information is provided may adjust the number of pixels corresponding to the section R to decrease. For example, in FIGS. 6A and 6B, the number of pixels corresponding to a section of 30-40% may be adjusted to decrease by N. This is only one embodiment, and information on a section whose number of pixels is to be increased may be provided, or information on a section whose number of pixels is to be maintained may be provided. That is, information on at least one section of sections whose number or pixels is to be increased, decreased, or maintained may be provided.

Referring to FIG. 7, the information on the region whose brightness is to be maintained may be represented in an electro optical transfer function (EOTF) for a code value. The electro optical transfer function may be a function for mapping an original brightness to levels of expressing a color of each pixel. For example, as shown in FIG. 7, one color which one pixel expresses may be expressed in 0-255 levels, and these levels may be mapped by an original brightness by a nit unit. In order to apply an image to the display device, information on pixels whose brightness is to be adjusted may be provided as a range of levels in which a pixel expresses one color. For example, in order to adjust a brightness of a pixel expressing a color in a level corresponding to a section C of FIG. 7, information on the section C may be provided for the display device.

Referring to FIG. 8, information on a region expressing a specific color whose brightness is to be maintained may be provided as the coordinates and a value E. Concretely, the coordinates of the region including a color located therein, in which a human eye sensitively responds to a change thereof, may be provided, and a reference value may be provided to prevent a value E of the color of the region from being greater than a predetermined value. At this point, the value E is a distance between adjacent colors and may indicate a range in which a human eye can perceive a difference in colors. The value E may be a just noticeable difference (JND). The reference value may be set by a producer.

Figure 9A:
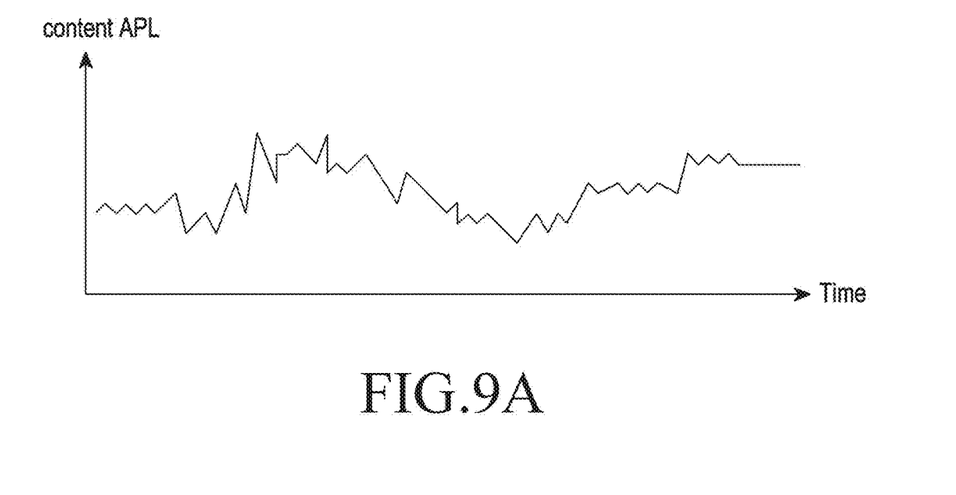
FIGS. 9A and 9B illustrate an APL value of image contents according to time in a graph.
Figure 9B:
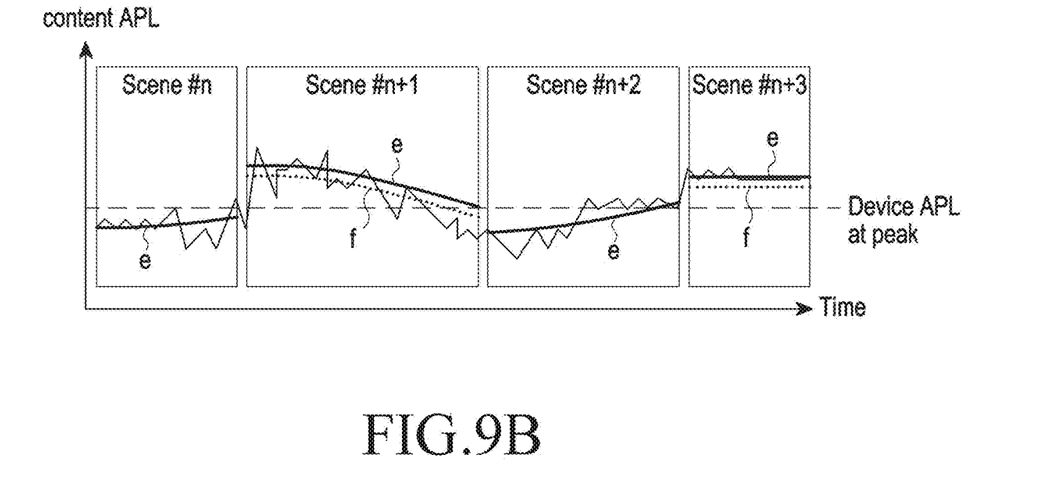

Hereinafter, referring FIGS. 9A and 9B, an adjustment of an APL value according to a plurality of scenes will be described. FIGS. 9A and 9B illustrate an APL value of image contents according to time in a graph.

FIG. 9A illustrates a change of an APL value of an image according to time, the image being displayed on the display device, and FIG. 9B illustrates the change of the APL value of the image according to time, which is divided according to scenes, the image being displayed on the display device.

The image contents include a plurality of scenes, and average brightness values of each scene, i.e. the APL values, may differ from each other. Therefore, the APL value of the image contents (content APL) may be represented according to time in the same graph as FIG. 9A. The obtained APL value of the image contents may be an average value for each scene (scene # n, scene #(n+1), scene #(n+2), scene #(n+3) . . . ). Line a of FIG. 9B indicates an obtained average APL value for each scene (scene # n, scene #(n+1), scene #(n+2), scene #(n+3) . . . ). The average APL value may be a moving average and be obtained by connecting average APL values obtained at each unit of movement affecting visual cells. Referring to FIG. 9B, it is noted that an average APL value for each scene is compared with the APL value at which one region of the display device has the maximum brightness value, so as to adjust the average APL value for each scene. Concretely, average APL values of a first scene (scene # n) and a third scene (scene #(n+2)), which are less than the APL value (device APL at peak) at which one region of the display device has the maximum brightness value, may not be adjusted. On the other hand, average APL values of a second scene (scene #(n+1)) and a fourth scene (scene #(n+3)), which are greater than the APL value (device APL at peak) at which one region of the display device has the maximum brightness value, may be adjusted from line e to line f. The average APL value is adjusted for each scene so as to provide a viewer's eye with a natural image. The division of the scene is decided by a producer, for example, and may be provided for the display device with a scene number.

Figure 10:
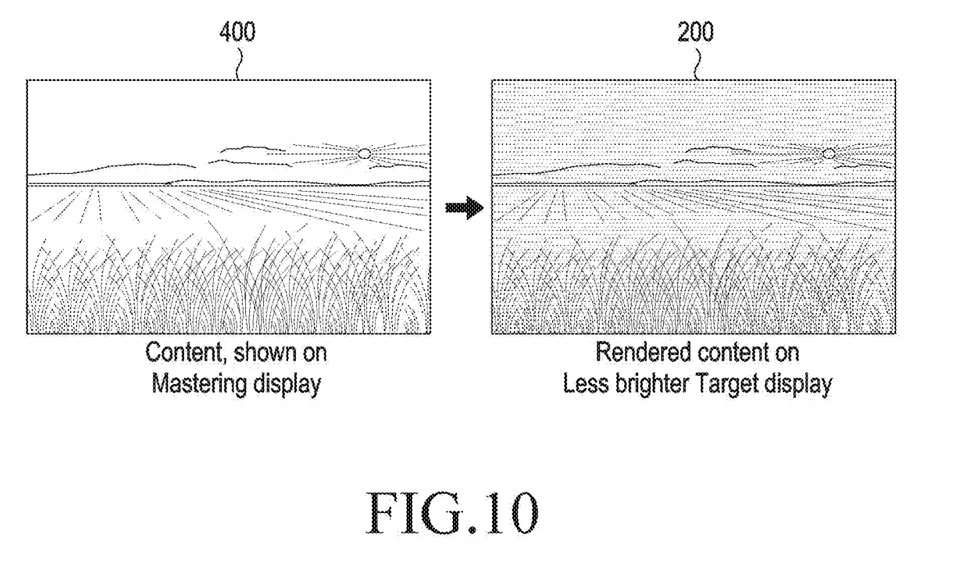
FIG. 10 illustrates one embodiment of adjusting image contents produced based on a mastering display and then applying the same to a display device.

Hereinafter, an effect of applying an image to a display device according to the disclosure will be described with reference to FIG. 10. FIG. 10 illustrates one embodiment of adjusting image contents produced based on a mastering display, and then applying the same to the display device. A brightness of a scene 400 of a mastering device may be adjusted and the scene may be displayed on a target display device as a scene 200. The entire brightness of the scene 200 displayed on the target display device may decrease, but details of the original scene 400 can be expressed without a part including color agglomeration.

Figure 11:
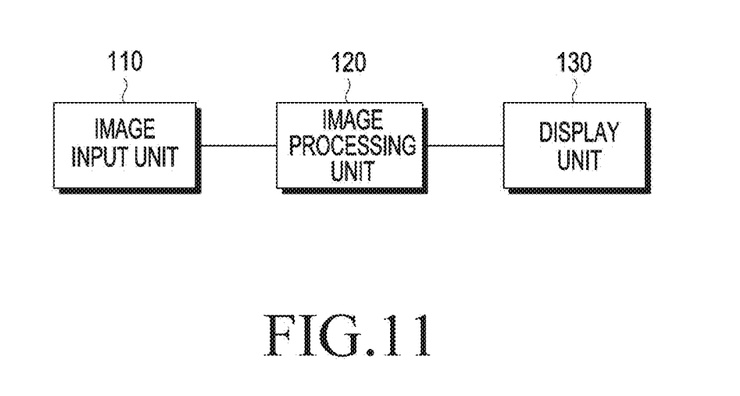
FIG. 11 briefly illustrates a configuration of a display device according to one embodiment of the disclosure.

Hereinafter, a display device according to the disclosure will be described with reference to FIG. 11. FIG. 11 briefly illustrates a configuration of the display device according to one embodiment of the disclosure.

As illustrated in FIG. 11, a display device 100 includes an image input unit 110, an image processing unit 120, and a display unit 130. The display device may be a digital TV, but is only one embodiment, and may be implemented as various display devices, such as a monitor, a laptop PC, a desktop PC, a tablet PC, a kiosk, and the like. In addition, a technical idea of the disclosure may be applied to electronic devices capable of processing an image, such as a set-top box, a game console, and the like, which have no display.

The image input unit 110 receives an image as input from the outside. The input image may be produced based on a mastering display, and the image may have a brightness range greater than a brightness range that can be expressed by the display device.

Further, the image input unit 110 may be implemented as a tuner for receiving broadcast contents, a terminal (for example, a HDMI terminal etc.) for receiving image contents from an external device, a communication module for receiving image contents from an external server, and the like, but it is only one embodiment and may be implemented in a different configuration for receiving an image as input.

The image processing unit 120 processes the image input from the image input unit 110 and then outputs the same to the display unit 130. In particular, the image processing unit 120 may measure a brightness expression performance for each divided region of the display device to form an APL graph and maps an APL value of the image input to the APL graph so as to adjust a brightness of the image to be suitable for the brightness range that can be expressed by the display device. In addition, in this adjustment process, information on a region whose brightness is to be adjusted and a region whose brightness is to be maintained may be used. The information may be provided as the coordinates and a histogram, and the like. The information may be transmitted to the display device as metadata and may be directly input to the display device by a user. In addition, in this adjustment process, information on a scene division number of an image may be used. The information on the scene number may also be provided to the display device by the user.

Further, the image processing unit 120 may be implemented as at least one processor. For example, the image processing unit 120 may be implemented by using at least one of a central processing unit (CPU), a graphic processing unit (GPU), and an application unit (AP).

According to one embodiment of the disclosure, the image processing unit 120 may generate at least one virtual image converted from a dynamic range of the input image by using a color domain which varies depending on context information, in order to maintain chroma of the image. This will be described later in detail.

The image adjusted by the image processing unit 120 may be output by the display unit 130. The display unit 130 outputs a final image which has been generated by the image processing unit 120. At this point, the display unit 130 may be implemented as a display, but it is only one embodiment and may be implemented as an image output terminal for outputting an image to an external device, and the like.

Further, a booting method of an electronic device according to the described various embodiments may be implemented as a program to be provided to a display device or an input device. In particular, a program including a display device control method may be stored in a non-transitory computer readable medium and be provided.

The non-transitory computer readable medium is not a medium which stores data for a short moment, such as a register, a cache, a memory, and the like, but indicates a medium which semi-permanently stores data and can be read by a device. Concretely, various applications or programs may be stored in the non-transitory computer readable medium such as a CD, a DVD, a hard disk, a Blu-ray disc, a USB, a memory card, a ROM, and the like, and be then provided.

In addition, the embodiments of the disclosure are illustrated and described above, but the disclosure is not limited to the described specific embodiment, and various modifications may be achieved by those skilled in the art to which the disclosure belongs without departing from the main idea of the disclosure as claimed in the claims. Further, these modifications should not be understood separately from the technical idea or the prospect of the disclosure.

The invention claimed is:

1. An image processing method of a display device, the method comprising:
    dividing a display unit of a display device into a plurality of regions;
    identifying one region among the plurality of regions;
    identifying a relation between average brightness values of the display unit and brightness values of the one region among the plurality of regions;
    identifying a first average brightness value of the display unit based on the relation, the first average brightness value being an average brightness value of the display unit which corresponds to a maximum brightness value of the brightness values of the one region;
    obtaining an average brightness value of each of a plurality of images input to the display device;
    obtaining an average value of the average brightness values of the plurality of images;
    identifying a first image among the plurality of images, the average brightness value of the first image being greater than the average value;
    mapping the average brightness value of the first image to the relation;
    generating an adjusted image by adjusting brightness values of other regions except a first region of the first image corresponding to the one region based on the first average brightness value and the average brightness value of the first image; and
    outputting the adjusted image and images other than the first image among the plurality of images.

2. The image processing method of claim 1, further comprising identifying the first region of the first image, based on coordinates indicating the one region.

3. The image processing method of claim 1, wherein generating the adjusted image comprises:
    in case that an input to increase a brightness value of the first region is identified, decreasing an average brightness value of regions except the first region corresponding to the one region, among the plurality of regions of the display unit, or
    in case that an input to decrease a brightness value of the first region is identified, increasing an average brightness value of regions except the first region corresponding to the one region, among the plurality of regions of the display unit.

4. The image processing method of claim 1, wherein mapping the obtained average brightness value of the first image to the relation comprises matching the obtained average brightness value of the first image to the average brightness values of the display unit.

5. The image processing method of claim 1, wherein a contrast ratio of the adjusted image indicates a value between a contrast ratio of the first image and a contrast ratio of the first image which is displayed on the display unit without adjustment.

6. The image processing method of claim 1,
    wherein the first image further comprises a maintenance region, and
    wherein a brightness of the maintenance region is not adjusted.

7. A display device comprising:
    an image input unit configured to receive a plurality of images as input;

an image processing unit configured to adjust a first image of the plurality of images to generate an adjusted image; and a display unit configured to output the adjusted image and images other than the first image among the plurality of images, wherein the image processing unit is configured to:
   divide the display unit into a plurality of regions,
   identify one region among the plurality of regions,
   identify a relation between average brightness values of the display unit and brightness values of the one region among the plurality of regions,
   identify a first average brightness value of the display unit based on the relation, the first average brightness value being an average brightness value of the display unit which corresponds to a maximum brightness value of the brightness values of the one region,
   obtain an average brightness value of each of the plurality of images,
   obtain an average value of the average brightness values of the plurality of images,
   identify the first image among the plurality of images, the average brightness value of the first image being greater than the average value,
   map the average brightness value of the first image to the relation, and
   generate an adjusted image by adjusting brightness values of other regions except a first region of the first image corresponding to the one region based on the first average brightness value and the average brightness value of the first image.

8. The display device of claim 7, wherein the image processing unit is further configured to identify the first region of the first image, based on coordinates indicating the one region.

9. The display device of claim 7, wherein the image processing unit is configured to:
   in case that an input to increase a brightness value of the first region is identified, decrease an average brightness value of regions except the first region corresponding to the one region, among the plurality of regions, or
   in case that an input to decrease a brightness value of the first region is identified, increase an average brightness value of regions except the first region corresponding to the one region, among the plurality of regions, thereby generating an adjusted image.

10. The display device of claim 7, wherein the image processing unit is further configured to match the obtained average brightness value of the first image to the average brightness values of the display unit.

11. The display device of claim 7, wherein a contrast ratio of the adjusted image indicates a value between a contrast ratio of the first image and a contrast ratio of the first image which is displayed on the display unit without adjustment.

12. The display device of claim 9, wherein the first image further comprises a maintenance region, and the image processing unit does not adjust a brightness of the maintenance region.

* * * * *